April 7, 1931.  R. F. DIRKES  1,800,056
MATCHING SPEED OF RECEIVING ROTATING ELEMENT FROM TELEGRAPH CODE SIGNALS
Filed July 15, 1929  2 Sheets-Sheet 1
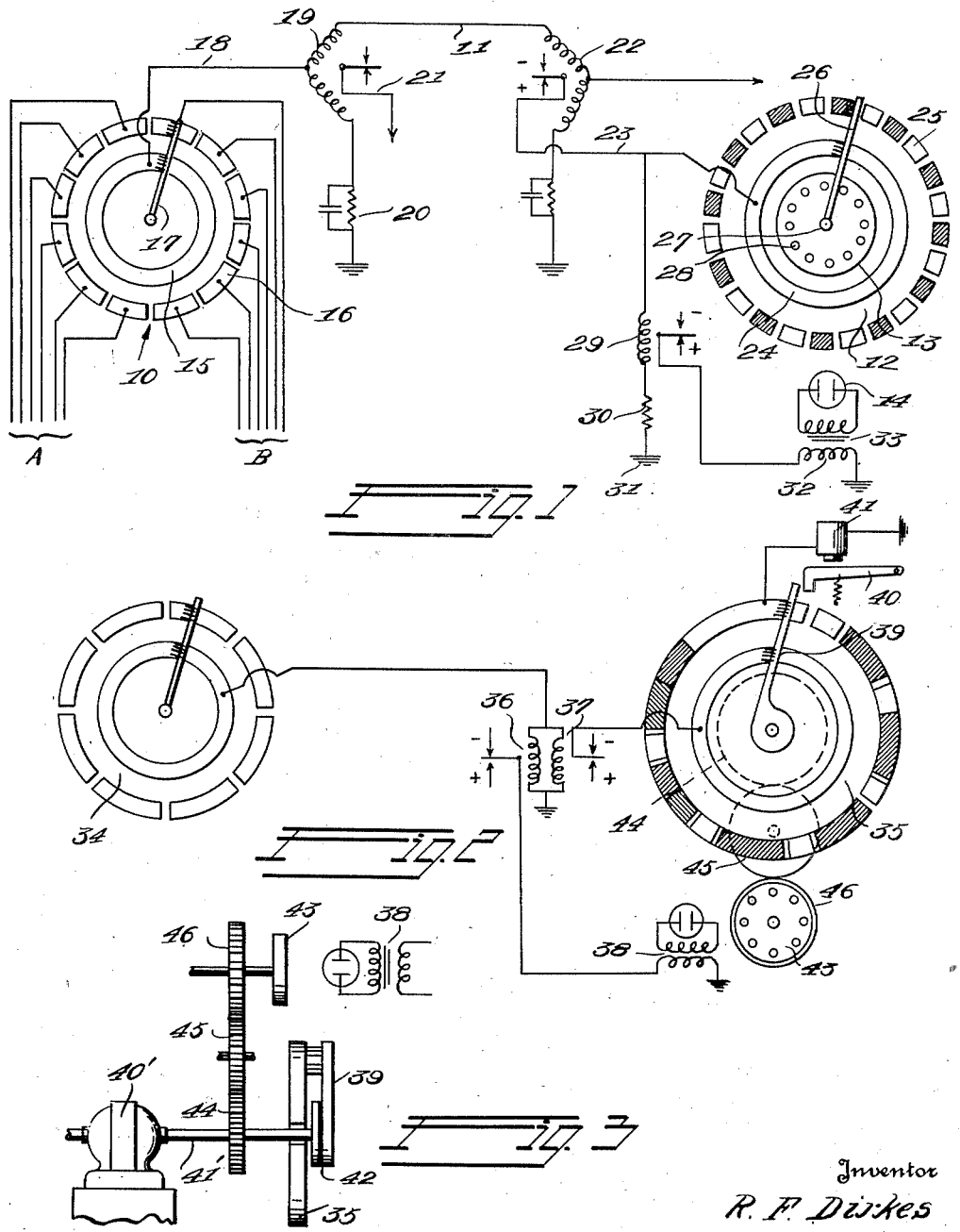
Inventor
R. F. Dirkes
Eugene C. Brown
Attorney

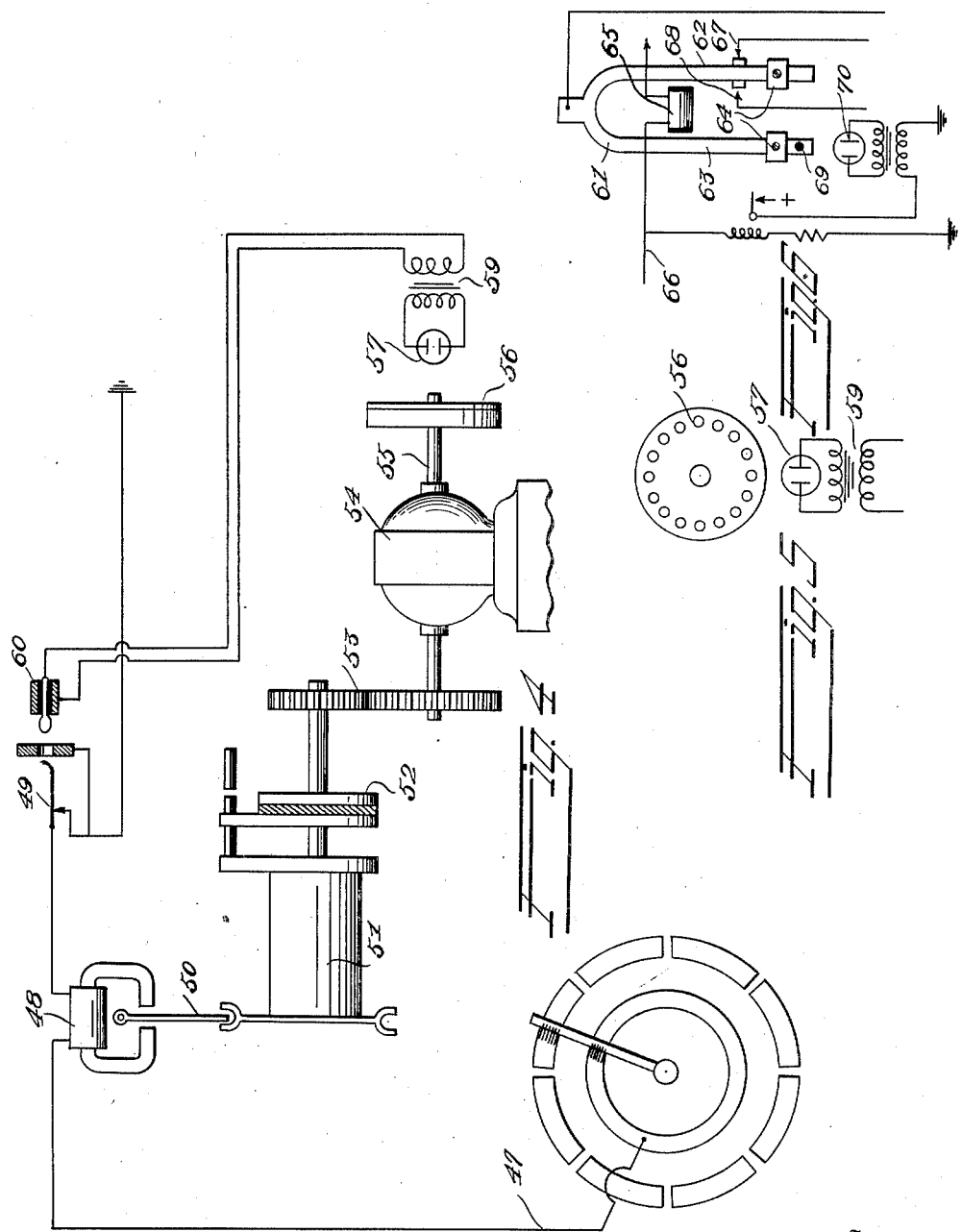

Patented Apr. 7, 1931

1,800,056

UNITED STATES PATENT OFFICE

ROBERT F. DIRKES, OF JAMAICA, NEW YORK, ASSIGNOR TO THE WESTERN UNION TELEGRAPH COMPANY, OF NEW YORK, N. Y., A CORPORATION OF NEW YORK

MATCHING SPEED OF RECEIVING ROTATING ELEMENT FROM TELEGRAPH CODE SIGNALS

Application filed July 15, 1929. Serial No. 378,454.

This invention relates to a device for matching the speed of rotating and vibrating elements, and more particularly to the synchronization of the rotating or vibrating parts of the transmitting and receiving apparatus of a telegraph system.

In multiplex telegraphy, as is well known to those versed in the art, it is the practice to employ rotary switches or distributors running synchronously at each end of the line for transmitting a prearranged sequence of positive and negative impulses, and for collecting the impulses at the receiving or repeating station and distributing them to the selective printing mechanism or to a rotary repeating switch.

The rotary transmitting and receiving distributors of such systems are operated by phonic motors controlled by vibrating reeds or tuning forks, the receiving distributor ordinarily operating at a slightly higher speed than the transmitting distributor and being set back into step with the transmitter at intervals by a correcting impulse. In order that the correct phase relation be maintained between the rotary elements of the transmitting and receiving distributors, it is necessary that they maintain a close speed relationship. This is ordinarily accomplished by the attendant at the receiving station requesting of the sending attendant the speed at which he is operating and from this information setting his receiving distributor approximately at that speed. The speed is then gradually refined by observing the drift of the receiver relative to the transmitter by means of the variations in the printing of the multiplex printers which receive the signals from the receiving distributors. If for any reason the speed of the transmitting or receiving distributors changes from time to time, this can only be ascertained by the incorrect operation of the printer or the speed correcting mechanism.

Also in simplex telegraph systems employing the socalled "start-stop" mechanism, the method ordinarily used for controlling the speed is to agree upon an operating speed for the circuit and to use similar tuning forks having shutters on its tines to sight on a rotating target at both the transmitting and receiving stations. The speed of the revolving elements is then set in accordance with the frequency of vibration of the forks. This method permits the speed agreed upon to be maintained, but if for some reason it becomes necessary or desirable to change the speed, it cannot be done without employing a new set of forks. Moreover, no means is provided other than the improper operation of the printer for determining any variations in speed between the receiving and transmitting elements.

Another application, where accurate speed matching is required is in the regeneration and reconstruction of attenuated signals by means of rotating or vibrating devices. For instance, in U. S. patent to Angel, No. 1,673,726 there is described a regenerative telegraph repeater employing a tuning fork which is maintained in vibration by the direct action of the received signal impulses, the fork being tuned to vibrate in synchronism with said impulses but at twice the frequency of the transmitted signals, the fork in turn picking off at regular intervals the desired portions of the signals and setting them up in a relay circuit which in turn repeats them into the succeeding line section.

The tuning fork must be tuned so that the natural frequency thereof is exactly twice that of the received signals in order to keep it in exact phase with the received signals and it is therefore highly desirable to provide some means for determining whether or not this phase relation is being exactly maintained.

One of the objects of the present invention is, therefore, to provide a method of and apparatus for enabling the operator at a receiving station to determine at any instant whether the rotating or vibrating apparatus is operating at the proper speed relative to the transmitting apparatus, and if not, to indicate whether the speed is too slow or too fast.

Another object is to provide a device responsive to the transmitted signals of a simplex or multiplex printing telegraph system for determining, at any instant, the speed relation of the receiving rotary apparatus with respect to the transmitting distributor.

Other objects and advantages will hereinafter appear.

In accordance with my invention I provide a stroboscopic device for use in conjunction with the receiving rotary or vibrative element, said device being operated in response to the received signals for visibly indicating the speed relationship of the receiving and transmitting elements. In a preferred form of the invention a target is provided, driven by a rotary part of the receiving apparatus at a definite speed relationship to the receiving distributor or letter selecting mechanism of the printer. The target is provided with a circular row of spots or other distinctive markings disposed concentric with the axis of the target and a lamp is positioned so as to illuminate the target when the lamp is lighted. The lamp is preferably of the gaseous conduction type such as the ordinary negative glow neon lamp, which is substantially inertialess, and is controlled by the received signals so as to momentarily and intermittently illuminate the target in cadence with the changes of polarity of the received signals. The number of spots on the target is so chosen that, when the target is rotating at the proper speed, the number of spots passing a given point during the time interval of one revolution of the transmitting distributor, will be equal to the number of segments on the transmitting distributor, that is, in a given period, the number of spots passing a definite point is equal to the number of signal impulses transmitted over the line. When illuminated by the neon lamp, in response to the received impulses, the spots will appear to stand still if the target is rotating at the proper speed, or to creep forward or backward if the target is operating at a slightly higher or lower speed respectively, than that required for proper operation of the printing mechanism. The rate of recession or progression of the spots indicates, of course, the difference in speed of the transmitting and receiving rotating apparatus.

In another embodiment of the invention I provide a distinctive spot on one tine of a vibrating tuning fork employed for regenerating signals, and intermittently illuminate the spot in response to the received signals. If the fork is vibrating at the same frequency as the received signals, or some multiple thereof, the spot will appear to stand still in one position of the tine but if the phase of the tine is slowly shifting relative to the received signals, the spot will appear to move in the path of the tine. The fork can thus be readily adjusted to correct the natural frequency thereof.

In order that the invention may be more fully understood, reference will be made to the accompanying drawing in which:

Figure 1 is a diagrammatic illustration of an embodiment of the invention applied to a multiplex telegraph system;

Figure 2 is a diagrammatic illustration of a simplex telegraph system using the "start-stop" mechanism and embodying my invention;

Figure 3 is an elevation of the receiving distributor of Figure 2 showing the disposition of the speed matching target relative thereto;

Figure 4 is a diagrammatic illustration showing the invention applied to a simplex printing machine, and Figure 5 shows the target employed with the printing mechanism of Figure 4.

Figure 6 is a diagrammatic illustration of a signal regenerating fork with my invention applied thereto.

In Figure 1, I have disclosed the principal elements of a multiplex telegraph system including the rotary transmitting distributor 10, the ordinary duplex line 11, receiving distributor 12 target 13 and neon lamp 14. The transmitting distributor 10 has an inner solid ring 15, an outer segmented ring 16, and a rotating brush 17 which sweeps over the contact rings 15 and 16. The segmented ring 16 is shown as composed of twelve segments, serving to transmit two channels of six signals each. Each group of segments is connected by conductors A and B to a tape transmitter or other mechanism for setting up the desired letter combinations of positive and negative impulses. The inner solid ring 15 is connected by a conductor 18 to the differential winding of a polarized relay 19, which winding is connected to the real line 11 and artificial line 20 in the usual manner. The contact arm of the polarized relay 19 is connected by a conductor 21 with a receiving distributor. For convenience the transmitting distributor only is illustrated in connection with one station and the receiving distributor only for the other station, although it is to be understood that both a receiving and transmitting distributor is employed at each station, and the stroboscopic device forming part of the present invention is associated with each receiving distributor. At the receiving station the contact arm of the differential polarized relay 22 is shown connected to the receiving distributor 12 by a conductor 23.

The receiving distributor is of the usual form and comprises the inner solid ring 24, outer segmented ring 25 and the rotating brush 26. The conductor 23 is connected to the solid contact ring 24 and the segments of the outer ring 25 are connected to the selecting magnets of the multiplex printing machine, not shown. Mounted upon the shaft 27 of the receiving distributor, so as to rotate with the brush 26 is the target 13. The target has a circular row of spots 28, adjacent its periphery, the number of such spots being equal to the number of segments on the transmitting distributor.

The neon lamp 14 is disposed so as to illuminate the disk or target 13 when lighted and the lamp is controlled by the tongue of a relay 29 energized by leakage current from the relay 21 through resistance 30 and ground 31. The tongue of the relay 29 is connected to one terminal of primary winding 32 of a transformer 33, the opposite terminal of said primary winding being connected to the ground. The secondary winding of the transformer 33 is connected to the electrodes of the neon lamp so that upon each reversal of current received over the line the lamp will be momentarily energized to illuminate the target. If the target is revolving at the proper speed, the spots thereon will appear to be in the same relative position with respect to each time that the light flashes, so that the visible impression will be that the target is standing still. If the target is operated at an improper speed, the spots will appear to rotate either in the direction of the brush or in the opposite direction, depending upon whether or not the target is operating above or below its proper speed.

It will thus be possible to ascertain at any instant whether the receiving distributor is operating at the correct speed, and if not, the speed of the phonic motor may be varied while observing the target, to bring the receiving distributor into synchronism with the transmitting distributor.

In Figure 2 a simplex system is shown employing start-stop mechanism and having the usual rotary distributor 34 at the transmitting station and a rotary receiving distributor 35 at the receiving or repeating station. The transmitting distributor is shown as having eight segments, six of which are for transmitting the letter code and two of which are for the stop and start signals. The inner solid ring is connected to the line which at the receiving station is connected to the windings of two polarized relays 36 and 37 connected in parallel so that the current divides therebetween.

The tongue of the relay 37 is connected to the solid ring 35 in the usual manner and the tongue of the relay 36 is connected to the primary of the transformer 38 which controls the illumination of the neon lamp in response to current reversals of the line signals. The rotating brush 39 of the receiving distributor is held in its "stop" position by a latch 40 which is released by the starting magnet 41 when the starting signal is received, thus allowing the brush to make one revolution. The brush 39 is driven by a continuously operating motor 40′ through a shaft 41′ and a slip-clutch 42. In order to provide a definite stopping time for the rotating brush it is usual to operate the brush at a speed approximately eight per cent faster than that of the brush of the transmitting distributor, and therefore in order that the target 43 may operate at the same speed as the transmitting distributor, I have shown the same driven through a series of gears 44, 45 and 46 having a ratio of approximately 108 to 100. This permits the number of spots on the target to equal the number of segments on the transmitting distributor.

In Figure 4 I have shown another application of my invention in which the relative speed of the letter selecting drum of a simplex printer can be determined with respect to the rate of transmission of the received signals. In this embodiment the line 47 from the transmitting distributor is connected at the receiving station to the ground through a polarized magnet 48 forming part of the printing mechanism and a jack 49. The armature 50 of the polarized magnet 48 controls the selecting of the desired letter combination in accordance with the sequence of the positive and negative signal impulses, through the letter selecting drum 51 driven by a slip-clutch 52 and gears 53 from the continuously operating motor 54. The construction of the simplex printer forms no part of the present invention, and since it is known to those familiar with the art only those elements necessary for an understanding of the present invention have been described.

The shaft 55 of the driving motor has affixed thereto, a speed matching target 56, upon which are placed the circular row of spots, illuminated by the neon lamp 57 as described in connection with the other applications of the invention. The primary winding of the transformer 59 through which the lamp is operated is connected to a plug 60 so that when it is desired to determine the relationship of the speed of the printer with respect to the received signals, it is only necessary to insert the plug in the jack and thus to connect the transformer in series with the line so that the lamp will be energized upon each current reversal. Since the drum 51 may be operated at a different speed from that of the motor, due to the ratio of the gears 53, it may be necessary to provide, upon the target 56 either more or less spots than there are segments on the transmitting distibutor. In Figure 5 I have shown the target provided with twice as many spots as there are segments on the transmitting distributor, making it applicable to a motor speed of one half that of the transmitting distributor speed.

In Figure 6 I have shown my invention applied to the fork 61 of a signal regenerating system. The tines 62 and 63 of the fork are tuned by the adjustable weights 64 so that the natural frequency of the fork is twice that of the received signals. The fork is maintained in vibration by the fork magnet 65 in response to the signals received over the conductor 66. Contacts 67 and 68 are engaged by the tine 62 for repeating the signals to the retransmitting relays. A distinctive spot 69 is provided on the tine 63 and a neon lamp 70 is disposed so as to illuminate the spot 69 in synchronism with each current reversal. As will be apparent, if the tines of the fork are vibrating in exact synchronism with the received signals, the spot 69 will appear to remain stationary in a definite position, when intermittently illuminated by the flashing neon lamp but if the tine is not vibrating in synchronism with the signals, the spot will appear to move backward and forward along the path of travel of the tine. The weights 64 may then be adjusted until there is no apparent movement of the spot to bring the fork into synchronism with the signals.

It is to be understood, of course, that many changes and modifications may be made in my invention and that it is applicable to the synchronization of rotary apparatus of different kinds, and therefore I do not desire to be limited to the exact details shown and described except in accordance with the appended claims.

What is claimed is:

1. In a communication system having rotary code signal transmitting and receiving apparatus the combination of rotary means associated with the receiving apparatus, operating at a definite speed relation thereto, means controlled by message code signals of the permutation type for momentarily and intermittently operating a lamp in synchronism with the received signals for illuminating said rotary means and distinctive markings on said rotary means for indicating the speed relationship thereof with respect to the rotary transmitting apparatus, when intermittently illuminated by said lamp.

2. The combination with a communication system having rotary signal transmitting and receiving apparatus, of a rotary target associated with the receiving apparatus operating at a definite speed relation thereto, a lamp controlled by message code signals of the permutation type for momentarily and intermittently illuminating said target in synchronism with each current reversal of the received signals and a circular row of markings on said target, the spacing of said markings being such that at the proper operating speed of the receiving apparatus each successive mark passes a definite point in cadence with the received signals.

3. In a communication system, a rotary distributor for transmitting signals of uniformly mixed polarity at a definite frequency, a rotary receiving apparatus having a rotary member operating at a definite speed relation thereto, a lamp for illuminating said rotary member, circuit connections for said lamp for momentarily flashing the lamp at each current reversal transmitted, and means on said rotary member for indicating the speed relation of said rotary receiving apparatus relative to said transmitting apparatus, when illuminated by said lamp.

4. The combination with a rotary distributor for transmitting signals of uniformly mixed polarity at a definite frequency, of a rotary receiving apparatus having an auxiliary member rotating at a definite speed relation thereto, means for illuminating said member with each current reversal transmitted and means on said member for indicating the speed of the rotary receiving apparatus relative to said transmitting apparatus when the member is illuminated by said illuminating means.

5. The combination with a rotary distributor for transmitting code signals of mixed polarity and definite periodicity, of a rotary receiving apparatus having a target operating at a definite speed relation thereto, a lamp for illuminating said target, a transformer for said lamp and circuit connection for said transformer controlled by message code signals of the permutation type for reversing the polarity of current through said transformer with each current reversal of the code signals to flash said lamp at each current reversal transmitted and means on said rotary member for indicating the speed of the rotary receiving apparatus relative to said transmitting apparatus, when the target is intermittently illuminated by said lamp.

6. The combination with a communication system for transmitting message signals of the permutation type at a definite frequency of a rotary receiving apparatus for operation at a definite speed with respect to the speed of transmission of said signals, means for indicating the speed relation of said apparatus with respect to such signals comprising a rotary target operating at a definite speed relative to said rotary receiving apparatus, a plurality of distinctive means on said target so positioned as to pass successively a definite point at the same frequency as that of the received signals when said receiving apparatus is operating at the correct speed and means controlled by the message signals for visibly indicating the frequency relation of the distinctive means and the signals at any instant.

7. In a communication system employing code signals of a definite periodicity, a receiving apparatus responsive to such signals having an intermittent rotative movement, a continuously operated driving mechanism for said receiving apparatus, a rotary member driven by said driving mechanism at a definite speed relation to the operating speed of said receiving apparatus and means controlled by message signals for visibly indicating the actual speed relation of said rotary member at any instant with respect to the correct speed thereof for proper operation of the receiving apparatus.

8. In a communication system employing code signals of a definite periodicity, a receiving apparatus responsive to such signals having an intermittent rotation, a continuously operated driving mechanism for said receiving apparatus, a rotary member driven by said driving mechanism at a definite speed relation to the operating speed of said receiving apparatus and illuminating means momentarily operated by each current reversal of the message signals for visibly indicating the actual speed relation of said rotary member, at any instant, with respect to the correct speed thereof for proper operation of the receiving apparatus.

9. In a communication system employing code signals of a definite periodicity, a receiving apparatus responsive to such signals employing start-stop mechanism, a continuously operating motor for driving said receiving apparatus, a rotary target driven by said motor at a definite speed relation to the operating speed of said receiving apparatus, a lamp associated with said rotary member and controlled by message signals for intermittently illuminating the rotary member at each current reversal of the signal impulses and means on said target for visibly indicating the actual speed thereof at any instant with respect to the correct speed thereof for proper operation of the receiving apparatus.

10. The method of determining the speed of a receiving apparatus for a communication system relative to the transmitting apparatus comprising transmitting regular message code signals of the permutation type to the receiving apparatus at a definite frequency, utilizing the signal current to momentarily illuminate a moving part of the receiving apparatus intermittently in cadence with the signals and observing the apparent movement of the moving part when so illuminated.

11. The method of determining the speed of a rotary receiving apparatus for a communication system relative to the transmitting apparatus comprising transmitting regular message code signals of irregularly mixed polarity to the receiving apparatus at a definite frequency, utilizing each change in polarity of the signal current to intermittently illuminate a rotary part of the receiving apparatus in cadence with the changes in polarity of the signals, and observing the apparent recession or progression of a series of definately arranged distinctive markings on said rotary part when so illuminated.

12. The combination with a transmitter for sending permutation code signals of mixed polarity to line, of a receiving apparatus having a member operating in synchronism with said signals, means for permitting said member to be viewed, a transformer and circuit connections for the transformer, controlled by message signals, for reversing the direction of the current flow through the primary of said transformer with each reversal of the polarity of the code signals, to momentarily operate said member at each current reversal to permit said member to be viewed momentarily and intermittently in synchronism with the received signals.

In testimony whereof I affix my signature.
ROBERT F. DIRKES.